United States Patent
Hennenberger et al.

(10) Patent No.: US 8,729,164 B2
(45) Date of Patent: May 20, 2014

(54) THERMOPLASTIC MOLDING COMPOSITION AND MOLDINGS PRODUCED THEREFROM WITH IMPROVED WEAR RESISTANCE

(71) Applicants: Florian Hennenberger, Heppenheim (DE); Mark Völkel, Ladenburg (DE); Rüdiger Bluhm, Limburgerhof (DE); Christian Maletzko, Altrip (DE); Andreas Gebhard, Otterberg (DE); Stefan Sutor, Mittelbrunn (DE)

(72) Inventors: Florian Hennenberger, Heppenheim (DE); Mark Völkel, Ladenburg (DE); Rüdiger Bluhm, Limburgerhof (DE); Christian Maletzko, Altrip (DE); Andreas Gebhard, Otterberg (DE); Stefan Sutor, Mittelbrunn (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/648,726

(22) Filed: Oct. 10, 2012

(65) Prior Publication Data

US 2013/0178565 A1    Jul. 11, 2013

Related U.S. Application Data

(60) Provisional application No. 61/545,596, filed on Oct. 11, 2011.

(51) Int. Cl.

| | | |
|---|---|---|
| C08G 18/42 | (2006.01) | |
| C08K 3/04 | (2006.01) | |
| C08K 5/15 | (2006.01) | |
| C08K 3/08 | (2006.01) | |
| C08K 3/34 | (2006.01) | |
| C08K 3/00 | (2006.01) | |
| C08K 7/02 | (2006.01) | |
| C08L 35/06 | (2006.01) | |

(52) U.S. Cl.
CPC ... C08K 3/04 (2013.01); C08K 3/08 (2013.01); C08K 3/34 (2013.01); C08K 3/0033 (2013.01); C08K 7/02 (2013.01); C08L 35/06 (2013.01)
USPC .......... 524/114; 524/107; 524/495; 524/497; 524/500; 523/215

(58) Field of Classification Search
CPC .............. C08K 3/04; C08K 3/08; C08K 3/34; C08K 3/0033; C08K 7/02; C08L 35/06
USPC .......... 523/215; 524/107, 114, 495, 497, 500, 524/539
See application file for complete search history.

(56) References Cited

U.S. PATENT DOCUMENTS

| | | | |
|---|---|---|---|
| 4,277,457 A * | 7/1981 | Taga et al. ..................... | 423/331 |
| 4,770,926 A * | 9/1988 | Yamamura et al. ........... | 442/203 |
| 4,870,153 A | 9/1989 | Matzner et al. | |
| 5,204,442 A * | 4/1993 | Nye .............................. | 528/125 |
| 5,412,024 A * | 5/1995 | Okada et al. .................. | 524/577 |
| 2005/0004269 A1 * | 1/2005 | Kakegawa .................... | 523/300 |
| 2005/0208313 A1 | 9/2005 | Bickle et al. | |
| 2006/0151751 A1 * | 7/2006 | Iizuka et al. ................. | 252/500 |
| 2007/0249773 A1 | 10/2007 | Becker et al. | |
| 2010/0189940 A1 | 7/2010 | Grothe et al. | |

FOREIGN PATENT DOCUMENTS

| | | |
|---|---|---|
| DE | 10329228 A1 | 1/2005 |
| DE | 102006015997 A1 | 10/2007 |
| EP | 0135130 A3 | 9/1987 |
| EP | 0113112 B1 | 6/1993 |
| GB | 1152035 A | 5/1969 |
| WO | WO-03103955 A1 | 12/2003 |
| WO | WO-2006000454 A1 | 1/2006 |
| WO | WO-2008023076 A1 | 2/2008 |

OTHER PUBLICATIONS

Translation of EP-1526296-A2.
International Search Report for PCT/EP2012/069990 dated Nov. 23, 2012.

* cited by examiner

*Primary Examiner* — Hannah Pak
(74) *Attorney, Agent, or Firm* — Novak Druce Connolly Bove + Quigg LLP

(57) ABSTRACT

The present invention relates to thermoplastic molding compositions and moldings with improved wear resistance comprising at least one thermoplastic matrix M, at least one carbon reinforcing fiber F, at least one carbon component K; at least one silicate component S, where the at least one silicate component S comprises particles which have, in any particle dimension, a length/thickness ratio greater than or equal to 3, and at least one titanium dioxide T.

14 Claims, 1 Drawing Sheet

THERMOPLASTIC MOLDING COMPOSITION AND MOLDINGS PRODUCED THEREFROM WITH IMPROVED WEAR RESISTANCE

CROSS-REFERENCE TO RELATED APPLICATIONS

This application claims the benefit of U.S. Provisional Application 61/545,596, filed Oct. 11, 2011, which is incorporated herein by reference.

The present invention relates to thermoplastic molding compositions comprising at least one thermoplastic matrix M, at least one carbon reinforcing fiber F, at least one carbon component K; at least one silicate component S, where the at least one silicate component S comprises particles which have, in any particle dimension, a length/thickness ratio greater than or equal to 3, and at least one titanium dioxide T.

The present application is also directed at a process for producing the thermoplastic molding composition, and to moldings with improved wear resistance comprising the thermoplastic molding composition of the invention. The moldings can in particular be used in the automobile sector, aircraft sector, or airline sector, e.g. in oil pumps, transmission control equipment, sliding bearings, gear wheels, roll coatings, and piston coatings.

Production of components and of workpieces suitable for applications subject to high levels of wear require molding compositions which firstly have very good tribological properties, for example low coefficient of friction and low wear rate, and secondly also have high mechanical strength, for example adequate tensile strength values and flexural strength values.

Various wear-resistant components and workpieces based on plastics composite materials are described in the prior art. These often use high-performance plastics, such as polytetrafluoroethylene (PTFE), polyvinylidene fluoride (PVDF), polyaryl sulfone (e.g. PSU, PESU, PPSU), polyether ketone (e.g. polyether ether ketone PEEK), and polyetherimide, and also other thermoplastic materials with lower heat resistance, e.g. polyester, polyamide, polyethylene terephthalate, polypropylene, polystyrene, and polystyrene copolymers, together with various fillers.

In order to obtain molding compositions and moldings with low friction values, the materials known as solid lubricants are often used, for example polytetrafluoroethylene (PTFE), graphite, and/or molybdenum sulfide ($MoS_2$).

A disadvantage is that the use of fillers, e.g. solid lubricants or hardening fillers (e.g. titanium dioxide) generally causes marked impairment of the mechanical properties of the molding compositions.

Fillers can generally be divided into various groups on the basis of their particle shape, in particular via the ratio of length to thickness of the filler particles (also termed L/D ratio, shape factor, or aspect ratio). Particulate fillers with spherical, spheroidal, or ellipsoidal particles generally have an L/D ratio in the range from 1 to less than 3. Acicular or lamellar fillers mostly have an L/D ratio greater or equal to 3, this L/D ratio applying to two particle dimensions in the case of lamellar particles and to any particle dimension in the case of acicular particles. When L/D ratios are greater than 100, the term fibrous fillers is generally used.

The prior art describes improved friction values obtained via filler particles which are very spherical and/or particularly fine. Document DE-A 10 2006 015 997 describes by way of example the use of particulate fillers with in essence spheroidal and/or ellipsoidal particles in a matrix made of thermoplastic.

The prior art also describes surface-modification of fillers with the aim of improving bonding between matrix and filler particles. Document WO 2008/023076 describes an ultrafine surface-modified titanium dioxide and use thereof in a polymeric matrix. Document WO 2006/000454 describes a polymeric material, in particular polyester fibers, comprising titanium dioxide and a particulate inorganic substance with relatively low hardness, e.g. carbonate, phosphate, or silicate.

WO 2003/103955 describes a sliding-bearing composite material with a sliding-layer material comprising the following: polyether ether ketone (PEEK), a lubricant, e.g. ZnS and/or barium sulfate, and titanium dioxide as hardening component. Particularly good wear rates are said to be achievable when particles of maximum fineness are used.

It is an object of the present invention to provide molding compositions which are improved over the prior art and which have improved tribological properties, i.e. low coefficient of friction and low wear rate, and adequate mechanical properties, e.g. tensile modulus, and tensile strength. Production of the molding composition is intended to be easy and inexpensive.

Surprisingly, it has been found that use of a specific combination of fillers can optimize the tribological and mechanical properties of thermoplastic molding compositions. Synergistic effects of the individual filler components in the combination of the invention were moreover found. Surprisingly, it was found that the tribological properties of thermoplastic molding compositions can be markedly improved via use of a silicate filler comprising particles, which have, in any particle dimension, a length/thickness ratio greater than or equal to 3—in particular in combination with further fillers.

Said object is achieved via provision of a thermoplastic molding composition comprising i) at least one thermoplastic matrix M;
    ii) at least one carbon reinforcing fiber F;
    iii) at least one carbon component K;
    iv) at least one silicate component S, where the at least one silicate component S comprises particles which have, in any particle dimension, a length/thickness ratio greater than or equal to 3; and
    v) at least one titanium dioxide T.

The molding compositions of the invention have improved tribological properties, in particular a low coefficient of friction and a low wear rate. The molding compositions comprising the abovementioned components M, F, K, S, and T moreover have good mechanical stability. The molding compositions of the invention also exhibit good processing stability.

Preference is given to a thermoplastic molding composition which comprises at least 5% by weight of the carbon reinforcing fiber F, at least 4% by weight of the carbon component K, and from 5 to 15% by weight of the silicate component S. Particular preference is given to a thermoplastic molding composition which comprises from 5 to 20% by weight of the carbon reinforcing fiber F, from 4 to 15% by weight of the carbon component K, and from 5 to 15% by weight of the silicate component S. Preference is particularly given to a thermoplastic molding composition which comprises specifically from 5 to 10% by weight of the carbon reinforcing fiber F; from 4 to 7% by weight of the carbon component K, and from 12 to 15% by weight of the silicate component S.

Unless otherwise stated, all quantitative data in % by weight are based on the entire thermoplastic molding composition.

The present application preferably provides a thermoplastic molding composition comprising:
- from 40 to 81% by weight of at least one thermoplastic matrix M;
- from 5 to 20% by weight of at least one carbon reinforcing fiber F;
- from 4 to 15% by weight of at least one carbon component K;
- from 5 to 15% by weight of at least one silicate component S, where the at least one silicate component S comprises particles which have, in any particle dimension, a length/thickness ratio greater than or equal to 3; and
- from 5 to 10% by weight of at least one titanium dioxide T.

The invention particularly preferably provides a thermoplastic molding composition comprising
- from 60 to 71% by weight of at least one thermoplastic matrix M;
- from 5 to 10% by weight of at least one carbon reinforcing fiber F;
- from 4 to 7% by weight of at least one carbon component K;
- from 12 to 15% by weight of at least one silicate component S, where the at least one silicate component S comprises particles which have, in any particle dimension, a length/thickness ratio greater than or equal to 3; and
- from 5 to 8% by weight of at least one titanium dioxide T.

The molding compositions of the invention can optionally comprise further components, for example selected from dyes, pigments, processing aids, and UV stabilizers. The amount of optional further components typically comprised in the molding composition is in the range from 0 to 10% by weight. The entirety of the optional further components typically does not exceed 10% by weight.

In one preferred embodiment, the abovementioned amounts of the components M, F, K, S, and T and optionally further components (data in % by weight) together give 100% by weight of the molding composition.

Thermoplastic Matrix M

Examples of suitable thermoplastic matrices M are known thermoplastics, such as polyesters (e.g. polyethylene terephthalate PET), polyethylene, polypropylene, polystyrene, polystyrene copolymers (e.g. ABS), polycarbonates, polyamide, polyvinyl chloride (PVC), polyacrylates (e.g. polymethyl methacrylate (PMMA)), and thermoplastics having heat resistance at high temperatures (also termed high-performance thermoplastics), such as polytetrafluoroethylene (PTFE), fluorothermoplastics (e.g. polyvinylidene fluoride (PVDF)), polyaryl sulfone (e.g. PESU, PSU, PPSU), polyether ketone (e.g. polyether ether ketone PEEK), and polyetherimide. The term polyaryl sulfone usually covers polyaryl ether sulfone (PESU), polysulfone (PSU), and polyphenyl sulfone (PPSU).

In one particularly preferred embodiment, the thermoplastic matrix M involves a polymer selected from the group consisting of polytetrafluoroethylene (PTFE), fluorothermoplastics, polyvinylidene fluoride (PVDF), polyaryl ether sulfone (PESU), polysulfone (PSU), polyphenyl sulfone (PPSU), polyether ketone, polyether ether ketone (PEEK), and polyetherimide, preferably selected from the group consisting of polyaryl ether sulfone (PESU), polysulfone (PSU), and polyphenyl sulfone (PPSU): in particular, the at least one polymeric matrix involves a polyaryl ether sulfone (PESU).

In one preferred embodiment, the at least one thermoplastic matrix M comprises (or consists of) repeat units of the formula (I)

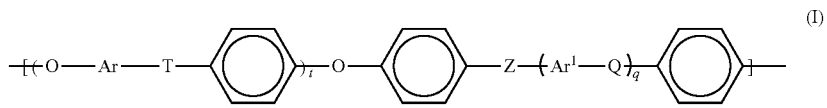

in which
t and q are mutually independently 0, 1, 2, or 3,
Q, T, and Z are respectively mutually independently a chemical bond or a group selected from —O—, —S—, —SO$_2$—, S=O, C=O, and —N=N—,
with the proviso that at least one of the groups T, Q, and Z is —SO$_2$— and if t and q are 0 Z is —SO$_2$—,
Ar and Ar$^1$ are respectively mutually independently a C$_6$-C$_{18}$-arylene group, where this can have substitution by C$_1$-C$_{12}$-alkyl, C$_6$-C$_{18}$-aryl, C$_1$-C$_{12}$-alkoxy groups, or by halogen atoms.

In particular, the thermoplastic matrix M can be composed of repeat units of the formula (I) in which
t and q are mutually independently 0, 1, or 2,
Q, T, and Z are respectively mutually independently a chemical bond or a group selected from —O— and —SO$_2$—,
with the proviso that at least one of the groups T, Q, and Z is —SO$_2$— and if t and q are 0 Z is —SO$_2$—, and
Ar and Ar$^1$ are respectively mutually independently a C$_6$-C$_{12}$-arylene group.

In one embodiment, the invention provides a molding composition where the at least one thermoplastic matrix M involves a polymer, where this is composed of, or consists of, repeat units of the formula (II):

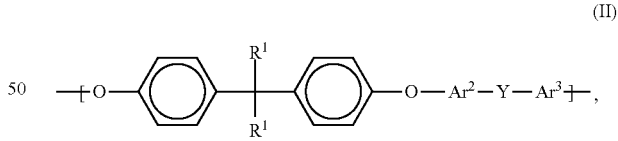

in which
R$^1$ is H, C$_1$-C$_6$-alkyl, or —(CH$_2$)$_n$—COOH,
n is an integer from 0 to 6,
Ar$^2$ and Ar$^3$ are respectively mutually independently a C$_6$-C$_{18}$-arylene group, where this can have a substitution by C$_1$-C$_{12}$-alkyl, C$_6$-C$_{18}$-aryl, C$_1$-C$_{12}$-alkoxy groups, or halogen atoms, and
Y is —SO$_2$—.

The thermoplastic matrix M can in particular be composed of repeat units of the formula (II) in which
R$^1$ is H or C$_1$-C$_4$-alkyl,
Ar$^2$ and Ar$^3$ are respectively mutually independently a C$_6$-C$_{12}$-arylene group, and
Y is —SO$_2$—.

The polyaryl sulfones can have different groups, depending on synthesis conditions. Said groups can be groups bonded to atoms of the polymer chain or can take the form of terminal groups of the polymer chain. Among the groups are those which are inert with respect to the other components of the thermoplastic composition and those which can react with the components. Among the inert groups are halogen groups, in particular chlorine groups and alkoxy groups, and especially methoxy groups, ethoxy groups, aryloxy groups, and preferably phenoxy or benzyloxy groups.

The aryl groups of the polyaryl sulfones here can be identical or different, and can mutually independently be an aromatic moiety having from 6 to 18 carbon atoms. Examples of suitable arylene moieties are phenylene, bisphenylene, terphenylene, 1,5-naphthylene, 1,6-naphthylene, 1,5-anthrylene, 9,10-anthrylene, and 2,6-anthrylene. Among these, preference is given to 1,4-phenylene and 4,4'-biphenylene. It is preferable that these aromatic moieties have no substitution. However, they can bear one or more substituents. Examples of suitable substituents are alkyl groups, arylalkyl groups, aryl groups, nitro groups, cyano groups, or alkoxy groups, and also heteroaromatics, such as pyridine, and halogen atoms. Among the preferred substituents are alkyl moieties having up to 10 carbon atoms, e.g. methyl, ethyl, isopropyl, n-hexyl isohexyl, and $C_1$-$C_{10}$-alkoxy moieties, such as methoxy, ethoxy, n-propoxy, n-butoxy, and aryl moieties having up to 20 carbon atoms, e.g. phenyl or naphthyl, and also fluorine and chlorine.

Average molar masses $M_n$ (number average) of the polyaryl ether sulfones used are typically in the range from 5000 to 60 000 g/mol, in particular from 10 000 to 30 000 g/mol. Relative viscosities of the polyaryl ether sulfones used are typically from 0.20 to 0.95 dl/g, measured in mixtures of phenol and dichlorobenzene. The method of measuring the relative viscosities depends on the solubility of the polyaryl ether sulfones and can also use 1% by weight N-methylpyrrolidone solution or a solution in 96% sulfuric acid, at respectively 20° C. or 25° C.

The thermoplastic matrix preferably involves a polyaryl ether sulfone (PESU), where this has a glass transition temperature above 200° C. In another preferred embodiment, the thermoplastic matrix involves a polyaryl ether sulfone corresponding to structural formula (I) in particular with a glass transition temperature above 210° C., e.g. of 225° C.

It is also possible to use a mixture of two or more different polyaryl ether sulfones as thermoplastic matrix M.

Polyaryl ether sulfones which can be used in the invention as thermoplastic matrix M can be produced by way of example by a method based on GB 1 152 035 and U.S. Pat. No. 4,870,153. Suitable process conditions for synthesizing polyarylene ether sulfones are described by way of example in EP-A 0 113 112 and EP-A 0 135 130.

By way of example, thermoplastic matrix M used can comprise polyaryl ether sulfones having at least one of the following repeat structural units (I1) to (I13):

(I1)

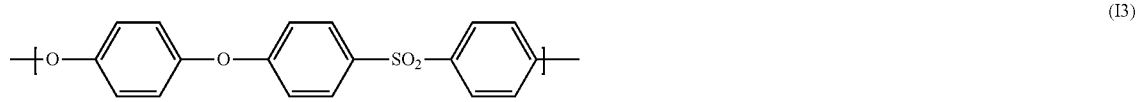
(I3)

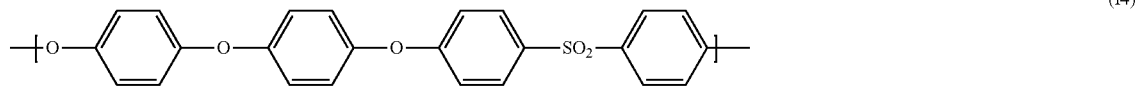
(I4)

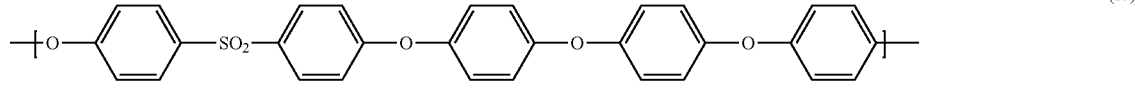
(I6)

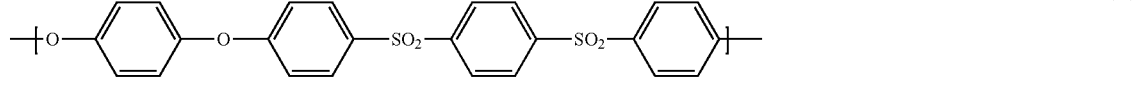
(I7)

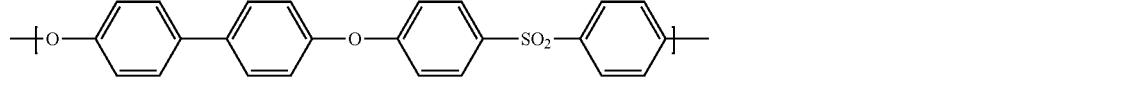
(I8)

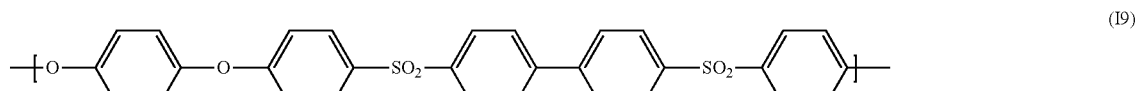
(I9)

(I13)

It is also possible to use a polyaryl ether sulfone comprising the structural unit (I15).

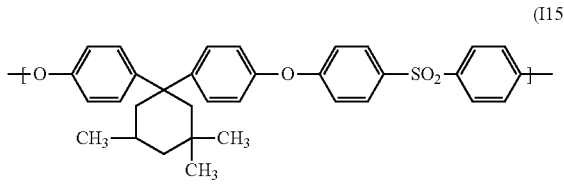

(I15)

It is particularly preferable to use polyaryl ether sulfones (PESU) which consist of, or comprise, repeat structural units of (I1).

The abovementioned examples of the various units of the formula (I) can be present individually or in combination with one another, randomly or distributed in blocks within the polyaryl ether sulfone preferably used. The thermoplastic matrix used preferably comprises a polyaryl ether sulfone which consists of one of the abovementioned structural units (I1) to (I13). In particular, the structural units (I1) to (I13) represent the only structural unit (optionally with the exception of the terminal group) present within the polymer.

In another preferred embodiment, the at least one polymeric matrix (M) can involve a polyphenyl sulfone (PPSU), where this comprises, or consists of, repeat structural units of the following formula (III):

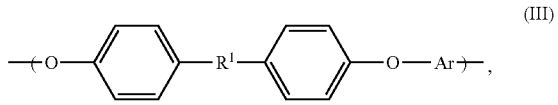

(III)

where
$R^1$ is C=O or —$SO_2$—, preferably —$SO_2$—;
Ar is a divalent aromatic moiety.
The aromatic moiety Ar is preferably a polycyclic aromatic moiety, preferably a biphenyl moiety.

In another embodiment, the at least one matrix can be selected from polysulfones (PSU) comprising (or consisting of) repeat structural units of the following formula (IV)

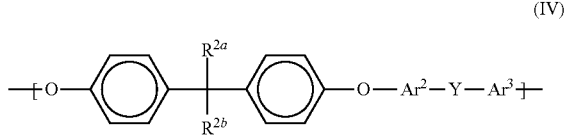

(IV)

where:
$R^{2a}$ and $R^{2b}$ are respectively mutually independently H, $C_1$-$C_6$-alkyl, or —$(CH_2)_p$—COOH, where p is an integer from 0 to 6;
$Ar^2$ and $Ar^3$ are respectively mutually independently a $C_6$-$C_{18}$-arylene group which optionally can have substitution by one or more groups selected from $C_1$-$C_{12}$-alkyl, $C_6$-$C_{18}$-aryl, $C_1$-$C_{12}$-alkoxy, and halogen atoms; and
Y is —$SO_2$—.

In the repeat units of formula (IV), it is preferable that $R^{2a}$ and $R^{2b}$ are respectively mutually independently H or $C_1$-$C_6$-alkyl.

In one preferred embodiment, the polysulfone (PSU) used derives from bisphenol A and dihalodiphenyl sulfone and has a glass transition temperature of from 180° C. to 190° C., in particular of 187° C.

The thermoplastic molding composition typically comprises an amount in the range from 50 to 85% by weight of the thermoplastic matrix M, preferably an amount in the range from 40 to 81% by weight, preferably from 60 to 71% by weight.

Carbon Reinforcing Fiber F

The invention uses at least one carbon reinforcing fiber F as fiber component. Other fibrous substances can preferably be used together with the carbon reinforcing fiber F. The other fibrous substances can be those selected from the known fibers which are typically used as filler in thermoplastic molding compositions.

The following can typically be used as other fibrous substances:
a) inorganic reinforcing fibers, such as boron fibers, glass fibers, silicate fibers, silica fibers, mineral fibers, ceramic fibers, and basalt fibers;
b) organic reinforcing fibers, such as aramid fibers, polyester fibers, nylon fibers, polyethylene fibers, and Plexiglas fibers;
c) and natural fibers, such as wood fibers, flax fibers, hemp fibers, and sisal fibers.

Particularly suitable other fibrous substances are inorganic mineral reinforcing fibers, e.g. glass fibers and mineral fibers.

The carbon reinforcing fiber F used in the invention can take the form of short fibers or long fibers, or of a mixture of short and long fibers. The average fiber length of the short fibers here is typically in the range from 0.1 to 1 mm. It is also possible to use carbon reinforcing fibers with an average fiber length in the range from 0.5 to 1 mm.

The at least one carbon reinforcing fiber F used particularly preferably comprises a long fiber. In particular, the at least one carbon reinforcing fiber F used in producing the thermoplastic molding composition has an average fiber length in the range from 1 to 50 mm, preferably from 1 to 10 mm, with particular preference in the range from 3 to 6 mm.

The average fiber length of the fibers present in the finished molding composition can in particular alter as a consequence of the steps in the process (e.g. extrusion), and in particular the thermoplastic molding composition comprises fibers with fiber lengths smaller than that of the fiber used.

he average fiber diameter of the at least one carbon reinforcing fiber F is preferably in the range from 5 to 10 μm, preferably from 5 to 8 μm, particularly preferably from 6 to 7 μm. The density (at 20° C.) of the at least one carbon reinforcing fiber F is preferably in the range from 1 to 2 g/cm³, preferably from 1.5 to 2 g/cm³. The carbon content of the at least one carbon reinforcing fiber F is preferably greater than or equal to 95% by weight (based on the carbon reinforcing fiber F).

In one preferred embodiment, the at least one carbon reinforcing fiber F involves a surface-treated carbon fiber. The surface of carbon reinforcing fibers is typically treated with organic substances, for example polyurethane, aromatic polymer, epoxy resins, or glycerol (e.g. sizes), with the aim of, for example, improving fiber properties or increasing compatibility with the matrix material. The surface treatment content of the at least one carbon reinforcing fiber F is preferably in the range from 0.5 to 6.5% by weight, preferably from 1 to 3% by weight (based on the carbon reinforcing fiber F).

In one particularly preferred embodiment of the invention, the at least one carbon reinforcing fiber F involves a surface-treated carbon fiber, in particular a carbon fiber surface-treated with glycerol and/or surface-treated with aromatic polymer, where the average diameter of the fiber is in the range from 5 to 10 μm.

Examples of suitable carbon reinforcing fibers F are Sigrafil C® carbon fibers (SGL Carbon Group).

The thermoplastic molding composition preferably comprises an amount in the range from 0.5 to 20% by weight of the at least one carbon reinforcing fiber F, preferably from 5 to 20% by weight, particularly preferably from 5 to 10% by weight (based in each case on the entire thermoplastic molding composition).

Carbon Component K

The at least one carbon component K in particular involves the known natural and synthetic carbon materials in solid form consisting essentially of elemental carbon. Carbon component K can take various forms or can be a mixture of said forms and can optionally comprise impurities. In particular, the at least one carbon component K can be selected from amorphous carbon, carbonization products (e.g. soot, carbon black), graphite, graphitic carbon and partially graphitic carbon, graphitized carbon and partially graphitized carbon. The expression "graphitic carbon or partially graphitic carbon" typically means types of carbon which comprise the graphite allotrope of the element carbon, irrespective of structural defects present and of content of the graphite structure. Partially graphitic carbons typically comprise amorphous carbon content and optionally impurities, and content of graphite-type structure. The expression graphitized carbon and partially graphitized carbon typically means a graphitic carbon which has been produced via a graphitizing treatment (high temperature process starting from various raw carbon materials at temperatures of about 1 900 to 2 700° C.).

It is preferable that the at least one carbon component K involves a graphitic carbon and/or a partially graphitic carbon, and in particular the at least one carbon component K involves a graphitized or partially graphitized carbon. These types of carbon are known by way of example as RGC® fillers (resilient graphitic carbon, Superior Graphite).

It is preferable that the at least one carbon component K involves a partially graphitic carbon which has at least 40% by weight content of graphite-type structure, in particular from 40 to 95% by weight, preferably from 80 to 95% by weight (based on the entire carbon component K). The average particle diameter ($D_{50}$ value) of the partially graphitic carbon used is preferably in the range from 5 to 20 μm. The carbon content of the partially graphitic carbon used is preferably in the range from 99 to 99.9% by weight, and it preferably has a porous structure with a density in the range from 1.5 to 2 $g/cm^3$, and a specific surface area in the range from 10 to 20 $m^2/g$.

The carbon component K used in the invention in particular involves a particulate carbon filler. For the purposes of the present application, the expression "particulate filler" (unlike a fiber filler) means a filler consisting essentially of particles with an L/D ratio smaller or equal than 100, preferably smaller than 100. The average particle diameter ($D_{50}$ value) of the at least one carbon component K is preferably in the range from 5 to 100 μm, preferably from 5 to 20 μm. The carbon content of the at least one carbon component is preferably in the range from 80 to 99.9% by weight (based on the carbon component K), preferably in the range from 99 to 99.9% by weight. The at least one carbon component preferably has a porous structure with a density in the range from 1.5 to 2 $g/cm^3$ and with a specific surface area in the range from 10 to 20 $m^2/g$.

Preferably suitable carbon components K are RGC®, resilient graphitic carbon materials (Superior Graphite), an example being RGC® 39 A.

The thermoplastic molding composition preferably comprises an amount (based on the entire thermoplastic molding composition) in the range from 4 to 15% by weight of the at least one carbon component K, preferably from 4 to 10% by weight, particularly preferably from 4 to 7% by weight.

Molding compositions with at most 10% by weight content of carbon component K have improved processability.

Silicate Component S

At least one silicate component S preferably involves a calcium silicate, preferably an enosilicate and/or phyllosilicate, in particular a calcium enosilicate of the general molecular formula $Ca[SiO_3]$.

Typically suitable materials are calcium silicates based on the natural silicate wollastonite, where said silicates can optionally be obtained via various treatment steps (e.g. grinding).

In the invention, the at least one silicate component S comprises particle which have, in any (or in specifically one) particle dimension, a length/thickness ratio greater than or equal to 3. In particular, the particles of the silicate component S have, in any particle dimension, an L/D ratio in the range from 3 to 100, in particular in the range from 3 to 50, preferably in the range from 3 to 15, particularly preferably in the range from 3 to 8.

In particular, at least 50% by weight, preferably at least 80% by weight, particularly preferably at least 90% by weight, and with particular preference at least 99% by weight (based on the silicate component S), of the particles of the at least one silicate component S have, in any particle dimension, a length/thickness ratio (L/D ratio) described above of greater than or equal to 3.

It is preferable that the at least one silicate component S comprises (or consists of) particles which have an average particle length in the range from 5 to 30 μm, preferably from 10 to 20 μm, and an average particle diameter in the range from 0.5 to 3 μm, preferably from 1 to 2 μm. In one embodiment, the at least one silicate component S comprises particles of what is known as block shape and/or of acicular shape.

It is preferable that the at least one silicate component S involves a calcium silicate in which at least 50% by weight, preferably at least 80% by weight, particularly preferably at least 90% by weight, and with particular preference at least 99% by weight, of the particles have, in any particle dimension, a length/thickness ratio (L/D ratio) greater than or equal to 3, particularly preferably in the range from 3 to 15.

The density of the at least one silicate component S is typically in the range from 2 to 3.5 $g/cm^3$, in particular in the range from 2.5 to 3 $g/m^3$. The Moh hardness of the at least one silicate component S is typically in the range from 4.5 to 5. The average particle diameter ($D_{50}$ value) of the at least one silicate component S is preferably in the range from 2 μm to 10 μm, in particular from 2 μm to 5 μm.

In one preferred embodiment, the silicate component S involves a surface-treated silicate. The surface-treatment of silicate fillers typically uses organic and/or organosilicon compounds, for example aminosilane, epoxysilane, methacrylic silane, methylsilane, or vinylsilane. In particular, the at least one silicate component S involves an epoxysilane-surface-treated silicate (in particular a wollastonite-based silicate).

Examples of suitable silicate components are fillers based on the natural calcium metasilicate wollastonite, e.g. Tremin® (Quarzwerke Gruppe), in particular Tremin 283 or 939.

The thermoplastic molding composition preferably comprises an amount in the range from 5 to 15% by weight of the at least one silicate component S, preferably from 10 to 15% by weight, particularly preferably from 12 to 15% by weight (based on the total amount of thermoplastic molding composition).

Titanium Dioxide T

The at least one titanium dioxide component T in particular involves a natural or synthetic titanium dioxide mineral. It preferably involves a rutile mineral.

The titanium dioxide can typically have been surface-treated and/or can typically have been treated via various steps (e.g. grinding). Titanium dioxide fillers are typically modified via surface-treatment with organosilicon compounds or with inorganic compounds. Examples of organosilicon compounds that can be used are aminosilane, epoxysilane, methacrylic silane, methylsilane, and vinylsilane. It is also possible to use a titanium dioxide which has an inorganic surface treatment, e.g. using aluminum compounds or using silicon compounds.

The $TiO_2$ content of the at least one titanium dioxide is typically from 80 to 99%, preferably from 90 to 95%. The density of the titanium dioxide used is typically in the range from 3.8 to 4.2 $g/cm^3$.

Preferably the at least one titanium dioxide is a surface-treated titanium dioxide in rutile form. Examples of suitable materials are Kronos® titanium fillers (Kronos Inc.).

The thermoplastic molding composition preferably comprises an amount in the range from 2 to 10% by weight of the at least one titanium dioxide T, preferably from 5 to 10% by weight, particularly preferably from 5 to 8% by weight.

One preferred embodiment of the invention provides a thermoplastic molding composition comprising:

from 40 to 81% by weight, preferably from 60 to 71% by weight,
of at least one polyaryl ether sulfone as thermoplastic matrix M;
from 5 to 20% by weight, preferably from 5 to 10% by weight, of at least one carbon reinforcing fiber F;
from 4 to 15% by weight, preferably from 4 to 7% by weight of, as carbon component K at least one particulate, graphitic carbon and/or one particulate, partially graphitic carbon;
from 5 to 15% by weight, preferably from 12 to 15% by weight of, as silicate component S at least one calcium silicate in which at least 50% by weight of the particles (based on the silicate component S) have, in any particle dimension, a length/thickness ratio greater than or equal to 3;
from 5 to 10% by weight, preferably from 5 to 8% by weight, of at least one titanium dioxide T.

The invention also provides a process for producing the thermoplastic molding compositions described above, where the thermoplastic matrix M is mixed with the components F, K, S, and T, and optionally with further components. The mixing of the components typically takes place via heating of the thermoplastic matrix M and addition of the filler components F, K, S, and T. It is also possible to begin by mixing at least two of the filler components, and then to add these to the thermoplastic matrix. The thermoplastic molding composition of the invention can typically be produced via extrusion. The thermoplastic molding compositions described are typically produced at a temperature in the range from 200 to 400° C., in particular from 360 to 390° C.

The invention further provides a molding produced from a molding composition described above of the invention. The present invention provides a molding comprising (or consistory of) a thermoplastic molding composition described above of the invention.

The moldings in particular involve household items, household devices, electronic components, garden devices, medical-technology devices, motor-vehicle components, or bodywork parts. In particular, they involve moldings which have to withstand relatively high mechanical load.

The molding of the invention can preferably involve a molding selected from gear wheels, pump casings, pump parts, valve casings, valve parts, gaskets, gasket rings, transmission control equipment, chain guides, sliding bearings, sliding shoes, pistons, piston rings, roll coatings, and piston coatings. The component of the invention preferably involves an oil pump or an oil flow regulator or a part thereof (e.g. for a motor vehicle), and in particular involves movable parts of an oil pump or of an oil flow regulator.

The present invention also provides the use of a thermoplastic molding composition described above for producing a molding for use in vehicle construction, in particular automobile construction (e.g. in the form of oil pump, transmission control system, oil regulation piston, or casing), in the food-and-drink and household sector (e.g. in the form of microwave tableware or a coating); in the construction of apparatus (e.g. in the form of pump component, packing for fractionation columns, seals, protective covers, casings, or filter membrane), or in heating systems and sanitary systems (e.g. in hot-water meters, rotors in heating-system circulation pumps, internal parts of fittings), in medical technology, or in electronics.

FIG. 1 shows a scanning electron micrograph of a test specimen of the thermoplastic molding composition of the invention (specimen no. 1 of inventive example 1). The following individual filler components can be seen, embedded in the thermoplastic matrix: the carbon component K (indicated by K), the silicate component S (indicated by S), and the titanium dioxide T (indicated by T).

The inventive examples below are intended to provide further explanation of the present invention.

EXAMPLE 1

Production of Thermoplastic Molding Compositions

Various molding compositions were produced using the following components:

Thermoplastic matrix M:
Polyether sulfone PESU (Ultrason E 2010, BASF)
Carbon reinforcing fiber F:
F1: Carbon fiber, average fiber length 6 mm, average fiber diameter 7 μm, surface treatment with an aromatic polymer, content of surface modifier from 1.5-6.5% by weight (Sigrafil C® 30 S006 APS SGL Carbon)
Further fibrous substance:
F2: Silicate-based mineral fiber with average fiber length 125 μm
Carbon component K:
Partially graphitized carbon with content of graphite-type structure in the range from 82 to 93% by weight (RGC 39A, Superior Graphit Europe)
Silicate component S:
Calcium metasilicate ($Ca[SiO_3]$) based on wollastonite, surface-modification with epoxysilane (Tremin 283 EST 800, Quarzwerke GmbH), L/D ratio 3
Titanium dioxide T:
Rutile pigment, surface treatment with aluminum compounds and silicon compounds, and also with a silicone compound (Kronos 2220), edge length in the range from 0.5 to 2 μm.

The components stated above were mixed in a (Berstorff, ZE 25×44) laboratory extruder at a temperature in the range from 360 to 390° C. (intake 95° C., die 390° C.) and at a melt pressure of 43 bar. The power rating was 2.8 kW and the rotation rate was 300 rpm. An amount of about 5 kg of thermoplastic molding composition was produced at a throughput of 10 kg/h.

The thermoplastic compositions stated in Table 1 were produced.

TABLE 1

Thermoplastic compositions, data in % by weight

| Component | 1 | c2 | c3 | c4 | c5 | 6 | 7 | 8 | 9 |
|---|---|---|---|---|---|---|---|---|---|
| Matrix M | 62.2 | 71.4 | 66.6 | 63.1 | 59.7 | 59.4 | 66.7 | 59.3 | 56.4 |
| Fiber F1 | 9.9 | — | — | — | — | 9.7 | 9.6 | 13.1 | 16.2 |
| Fiber F2 | — | — | — | — | — | — | — | — | — |
| Carbon K | 6.8 | 7.0 | 12.3 | 16.1 | 19.9 | 10.8 | 13.3 | 6.8 | 6.7 |
| Silicate S | 13.8 | 14.2 | 13.9 | 13.6 | 13.4 | 13.6 | 13.5 | 13.7 | 13.6 |
| Titanium dioxide T | 7.3 | 7.5 | 7.3 | 7.2 | 7.1 | 7.2 | 7.1 | 7.2 | 7.2 |

| Component | 10 | 11 | 12 | C13 | C14 |
|---|---|---|---|---|---|
| Matrix M | 55.9 | 50.9 | 62.5 | 62.3 | 63.5 |
| Fiber F1 | 12.9 | 15.8 | 9.9 | 9.9 | — |
| Fiber F2 | — | — | 6.6 | 13.2 | 13.1 |
| Carbon K | 10.7 | 13.1 | 6.8 | 6.9 | 16.3 |
| Silicate S | 13.5 | 13.2 | 6.9 | — | — |
| Titanium dioxide T | 7.1 | 7.0 | 7.3 | 7.3 | 7.2 |

The compositions stated above for the specimens were confirmed by means of thermogravimetric analysis, by means of density measurements, and by means of the residue insoluble in N-methylpyrrolidone (NMP).

In addition to the thermoplastic compositions described in Table 1, a commercially available tribologically optimized plastic based on polyaryl ether sulfone was studied as reference (Ref), comprising 10% by weight of carbon fiber, 10% by weight of PTFE, and 10% by weight of graphite.

EXAMPLE 2

Tribological and Mechanical Studies

The following tribological studies and studies related to mechanical strength were carried out on specimen moldings made of the molding compositions described in Example 1, on the thermoplastic matrix, and on the reference:

i) wear rate ranking, specific wear rate, coefficient of sliding friction to ASTM G137 with predominantly normal fiber orientation ii) quasistatic tensile test to ISO 527 to determine tensile modulus, tensile strength, and tensile strain at break (with predominant fiber orientation in direction of tension).

Table 2 presents the results for tribological and mechanical characterization together with the respective confidence intervals determined:

TABLE 2

Results of studies

| | Matrix | REF | 1 | C2 | C3 | C4 |
|---|---|---|---|---|---|---|
| Linear wear rate [μm/h] | 70 000 ± 9000 | 25 ± 5.7 | 6.1 ± 0.6 | 8.5 ± 3.4 | 8.8 ± 1.1 | 6.2 ± 1.2 |
| Spec. wear rate [$10^{-6}$ mm$^3$/nm] | 3900 ± 540 | 1.4 ± 0.3 | 0.34 ± 0.03 | 0.47 ± 0.19 | 0.49 ± 0.06 | 0.34 ± 0.07 |
| Coefficient of sliding friction | 0.27 ± 0.02 | 0.41 ± 0.06 | 0.18 ± 0.03 | 0.27 ± 0.05 | 0.3 ± 0.02 | 0.27 ± 0.02 |
| Tensile modulus [MPa] | 2337 ± 38 | 10 293 ± 197 | 10 357 ± 236 | 4031 ± 51 | 4611 ± 114 | 5204 ± 91 |
| Tensile strength [MPa] | 80 ± 0 | 105 ± 3 | 117 (±3) | 80 ± 1 | 73 ± 0 | 74 ± 4 |
| Tensile strain at break [%] | 6.0 ± 0.1 | 1.3 ± 0.1 | 1.5 ± 0.1 | 3.3 ± 0.2 | 2.1 ± 0 | 1.8 ± 0.2 |

| | C5 | 6 | 7 | 8 | 9 | 10 |
|---|---|---|---|---|---|---|
| Linear wear rate [μm/h] | 10.3 ± 3.5 | 6.9 ± 0.4 | 5.8 ± 0.3 | 7.6 ± 1.4 | 9.9 ± 0.7 | 25 ± 18 |

TABLE 2-continued

| Results of studies | | | | | | |
|---|---|---|---|---|---|---|
| Spec. wear rate [$10^{-6}$ mm$^3$/nm] | 0.57 ± 0.19 | 0.38 ± 0.02 | 0.32 ± 0.02 | 0.42 ± 0.08 | 0.55 ± 0.04 | 1.4 ± 1.0 |
| Coefficient of sliding friction | 0.21 ± 0.03 | 0.19 ± 0.01 | 0.20 ± 0.02 | 0.19 ± 0.02 | 0.18 ± 0.02 | 0.2 ± 0.02 |
| Tensile modulus [MPa] | 7902 ± 170 | 11 405 ± 281 | 12 289 ± 152 | 13 017 ± 359 | 14 539 ± 210 | 10 836 ± 227 |
| Tensile strength [MPa] | 95 ± 2 | 117 ± 2 | 113 ± 2 | 126 ± 7 | 135 ± 3 | 134 ± 3 |
| Tensile strain at break [%] | 1.8 ± 0.1 | 1.3 ± 0 | 1.1 ± 0 | 1.3 ± 0.1 | 1.2 ± 0.1 | 1.7 ± 0.1 |

| | Specimen number | | | |
|---|---|---|---|---|
| | 11 | 12 | C13 | C14 |
| Linear wear rate [µm/h] | 51 ± 17 | 15 ± 2 | 67 ± 7 | 77 ± 6 |
| Spec. wear rate [$10^{-6}$ mm$^3$/nm] | 2.9 ± 0.9 | 0.85 ± 0.12 | 3.7 ± 0.4 | 4.3 ± 0.3 |
| Coefficient of sliding friction | 0.22 ± 0.02 | 0.3 ± 0.04 | 0.24 ± 0.02 | 0.3 ± 0.1 |
| Tensile modulus [MPa] | 13 520 ± 284 | 11 005 ± 157 | 10 846 ± 160 | 14 655 ± 199 |
| Tensile strength [MPa] | 137 ± 4 | 122 ± 3 | 123 ± 3 | 145 ± 4 |
| Tensile strain at break [%] | 1.3 ± 0.1 | 1.5 ± 0.1 | 1.6 ± 0.2 | 1.3 ± 0.1 |

EXAMPLE 3

Electron Micrographs

Scanning electron micrographs were made of the thermoplastic composition of experiment 1 (specimen no. 1). The fillers could be shown to have good deagglomeration and homogeneous distribution within the thermoplastic matrix. The scanning electron micrographs moreover show that the thermoplastic matrix has good adhesion to the fillers, in particular to the fiber component.

The carbon component in the electron micrograph is indicated by K, the silicate component by S, and the titanium dioxide by T.

The invention claimed is:

1. A thermoplastic molding composition comprising
   i) at least one thermoplastic matrix M;
   wherein the at least one thermoplastic matrix M comprises repeat units of the formula (I)

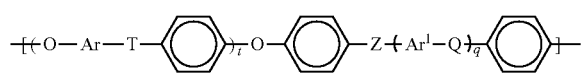

(I)

in which
   t and q are mutually independently 0, 1, 2, or 3,
   Q, T, and Z are respectively mutually independently a chemical bond or a group selected from —O—, —S—, —SO$_2$—, S=O, C=O, N=N, and,
   with the proviso that at least one of the groups T, Q, and Z is —SO$_2$— and if t and q are 0, Z is —SO$_2$—, Ar and Ar$^1$ are respectively mutually independently a C$_6$-C$_{18}$-arylene group, wherein this can have substitution by C$_1$-C$_{12}$-alkyl, C$_6$-C$_{18}$-aryl, C$_1$-C$_{12}$-alkoxy groups, or by halogen atoms;
   ii) at least one carbon reinforcing fiber F;
   iii) at least one carbon component K;
   iv) at least one silicate component S, where the at least one silicate component S comprises particles which have acicular shape, block shape, or combinations thereof, and a length/thickness ratio in the range from 3 to 15; and
   v) at least one titanium dioxide T.

2. The thermoplastic molding composition according to claim 1, which comprises
   from 40 to 81% by weight of said at least one thermoplastic matrix M;
   from 5 to 20% by weight of said at least one carbon reinforcing fiber F;
   from 4 to 15% by weight of said at least one carbon component K;
   from 5 to 15% by weight of said at least one silicate component S, where the at least one silicate component S comprises particles which have acicular shape, block shape, or combinations thereof, and a length/thickness ratio in the range from 3 to 15; and
   from 5 to 10% by weight of said at least one titanium dioxide T.

3. The thermoplastic molding composition according to claim 1, wherein the at least one carbon reinforcing fiber F involves a surface-treated carbon fiber of which the average diameter is in the range from 5 to 10 µm.

4. The thermoplastic molding composition according to claim 1, wherein the at least one carbon component K involves a graphitic carbon and/or a partially graphitic carbon.

5. The thermoplastic molding composition according to claim 1, wherein the at least one silicate component S involves a calcium silicate in which at least 50% by weight of the particles have acicular shape, block shape or combinations thereof, and a length/thickness ratio in the range from 3 to 15.

6. The thermoplastic molding composition according to claim 1, wherein the at least one silicate component S involves a calcium enosilicate of the general molecular formula $Ca[SiO_3]$.

7. The thermoplastic molding composition according to claim 1, wherein the at least one titanium dioxide T involves a surface-treated titanium dioxide in rutile form.

8. The thermoplastic molding composition according to claim 1, which comprises
   from 40 to 81% by weight of at least one polyaryl ether sulfone as the thermoplastic matrix M;
   from 5 to 20% by weight of said at least one carbon reinforcing fiber F;
   from 4 to 15% by weight of, as the carbon component K, at least one particulate, graphitic carbon and/or one particulate, part-graphitic carbon;
   from 5 to 15% by weight, as the silicate component S, at least one calcium silicate in which at least 50% by weight of the particles (based on the silicate component S) have acicular shape, block shape, or combinations thereof, and a length/thickness ratio in the range from 3 to 15; and
   from 5 to 10% by weight of said at least one titanium dioxide T.

9. A process for producing the thermoplastic molding composition according to claim 1, where the thermoplastic matrix M is mixed with the components F, K, and T, and optionally with further components.

10. A molding comprising the thermoplastic molding composition according to claim 1.

11. The molding according to claim 10, which involves the molding selected from gear wheels, pump casings, pump parts, valve casings, valve parts, gaskets, gasket rings, transmission control equipment, chain guides, sliding bearings, sliding shoes, pistons, piston rings, roll coatings, and piston coatings.

12. The molding according to claim 10, which involves an oil pump or an oil flow regulator or a part thereof.

13. The molding according to claim 10 where the molding is for use in vehicle construction, in the food-and-drink and household sector, in the construction of apparatus, in heating systems and sanitary systems, in medical technology, or in electronics.

14. The thermoplastic molding composition according to claim 1, wherein Q, T, and Z are respectively mutually independently a chemical bond or a group selected from —O— and —$SO_2$—, and Ar and $Ar^1$ are respectively mutually independently a $C_6$-$C_{12}$-arylene group, where this can have substitution by $C_1$-$C_{12}$-alkyl, $C_6$-$C_{18}$-aryl, $C_1$-$C_{12}$-alkoxy groups, or by halogen atoms.

* * * * *